United States Patent
Röders et al.

(10) Patent No.: US 10,335,914 B2
(45) Date of Patent: Jul. 2, 2019

(54) METHOD FOR DETERMINING A POSITION OF A WORK PIECE IN A MACHINE TOOL

(71) Applicant: P + L GmbH & Co. KG, Soltau (DE)

(72) Inventors: Jürgen Röders, Soltau (DE); Saman Fröhlich, Tostedt (DE); Sönke Wulff, Rotenburg an der Wümme (DE)

(73) Assignee: P + L GmbH & Co. KG, Soltau (DE)

( * ) Notice: Subject to any disclaimer, the term of this patent is extended or adjusted under 35 U.S.C. 154(b) by 0 days.

(21) Appl. No.: 15/550,587

(22) PCT Filed: Jul. 27, 2015

(86) PCT No.: PCT/EP2015/067175
§ 371 (c)(1),
(2) Date: Aug. 11, 2017

(87) PCT Pub. No.: WO2016/128074
PCT Pub. Date: Aug. 18, 2016

(65) Prior Publication Data
US 2018/0029186 A1 Feb. 1, 2018

(30) Foreign Application Priority Data
Feb. 13, 2015 (DE) .......... 10 2015 202 657

(51) Int. Cl.
*B23Q 17/09* (2006.01)
*B23Q 17/22* (2006.01)
*G05B 19/402* (2006.01)

(52) U.S. Cl.
CPC ......... *B23Q 17/22* (2013.01); *B23Q 17/0914* (2013.01); *B23Q 17/0952* (2013.01);
(Continued)

(58) Field of Classification Search
CPC ............... B23Q 17/22; B23Q 17/0952; B23Q 17/0957; B23Q 17/0914; B23Q 17/2241;
(Continued)

(56) References Cited

U.S. PATENT DOCUMENTS

2002/0197122 A1  12/2002  Mizutani et al.
2004/0030440 A1   2/2004  Murai et al.
(Continued)

FOREIGN PATENT DOCUMENTS

CN    103170878    6/2013
EP      1197819    4/2004
(Continued)

OTHER PUBLICATIONS

International Search Report for Application No. PCT/EP2015/067175 dated Nov. 5, 2015 (English Translation, 3 pages).

*Primary Examiner* — Ryan A Jarrett
(74) *Attorney, Agent, or Firm* — Michael Best & Friedrich LLP

(57) ABSTRACT

The invention relates to a method for determining a position of a work piece and of a tool in a machine tool, in which a work piece is clamped at the machine tool, in which the tool is subsequently inserted into a rotatable spindle shaft by means of a tool holder and the spindle shaft is set into rotation, in which an electrical voltage is applied between the work piece and the tool, in which the tool and the work piece are displaced with respect to one another, and in which a variation in the applied voltage is determined in the event of a contact between the tool and the work piece, and the respective position of the work piece and/or of the tool is determined and recorded in a computing program for control/regulation of the machining of the work piece.

20 Claims, 12 Drawing Sheets

(52) U.S. Cl.
CPC ..... *B23Q 17/0957* (2013.01); *B23Q 17/2241* (2013.01); *G05B 19/402* (2013.01); *B23Q 2716/00* (2013.01); *B23Q 2717/00* (2013.01); *G05B 2219/37618* (2013.01)

(58) Field of Classification Search
CPC ............ B23Q 2717/00; B23Q 2716/00; G05B 19/402; G05B 2219/37618
See application file for complete search history.

(56) References Cited

U.S. PATENT DOCUMENTS

| | | |
|---|---|---|
| 2010/0105289 A1 | 4/2010 | Yonezu et al. |
| 2013/0211598 A1 | 8/2013 | Fujii |

FOREIGN PATENT DOCUMENTS

| | | |
|---|---|---|
| EP | 1541282 | 6/2005 |
| EP | 2151725 | 2/2010 |
| EP | 2165803 | 3/2010 |
| EP | 2476511 | 7/2012 |
| JP | 2003001548 | 1/2003 |
| WO | 2014072554 | 5/2014 |

(state of the art)

(state of the art)

(state of the art)

METHOD FOR DETERMINING A POSITION OF A WORK PIECE IN A MACHINE TOOL

FIELD OF THE INVENTION

The invention relates to a method for determining a position of a work piece and of a tool in a machine tool.

BACKGROUND OF THE INVENTION

The requirements regarding the precision of machine tools with rotating tools, e.g. milling machines, keep increasing. Apart from the precision of the actual machining as determined by the precision of the machine, the machining tool, the tool holder etc., the precision in setting up the work piece or in setting the zero point for the machining is increasingly turning into a limiting factor for the obtainable precision.

After a work piece has been inserted into a machine and clamped for machining, whether it be by means of pallets or also by conventional means such as a bench vise, the clamping position of the work piece is usually determined with suitable auxiliary devices, and the zero point for machining is determined based on the identified clamping position.

What is known from the state of the art is the probing of the zero point with an automatic probing device. At one end, the latter has a probe tip with a probing ball for probing the work piece. At the other end, it is attached to a tool holder through which it can be interchanged into the machining spindle. For probing a work piece, the machine moves the automatic probing device held at the spindle to the work piece via the tool holder, until the tracer pin that is located at the bottom of the automatic probing device touches the work piece and deflects it so far that the probing device switches. At that, modern automatic probing devices are constructed in such a way that the path for the deflection of the tracer pin is always exactly identical and that it can be calibrated. When the automatic probing device switches, a signal is sent by the automatic probing device to the control, and the latter determined the actual position of the machine for this probing position. In this manner, any edges, bores etc. can be probed, and their relative position in the machine can be determined in a relatively precise manner. Modern probing devices are highly accurate. Therefore, the position of the probing device can be determined for the switch point with a very high precision.

Nonetheless, the precision of this method is limited by the predefined procedure itself. After the predefined geometry elements have been probed in a machine by means of an automatic probing device, the tool holder at which the automatic probing device is attached must be exchanged from the spindle again, and the machining tool that is desired for the machining process must be interchanged into the spindle. Since the clamping position of the tool holders is never exactly identical, deviations occur in the course of this exchange process. In addition, in most cases the length of the automatic probing devices from the lay-on surface of the tool holder up to the tip of the tracer pine does not correspond to the length of the machining tool from the lay-on surface of the tool holder up to the tool tip. Additional deviations occur if the spindle is not positioned exactly in parallel with respect to the displacement direction of the axis that displaces the spindle in the direction of the spindle axis. Even minimal tilting of the spindle leads to an offset between the probing and the machining procedure. This tilting has the more impact on the probing accuracy the greater the length difference between the machining tool and the automatic probing device.

SUMMARY OF THE INVENTION

The invention provides, in one aspect, a method for determining a position of a work piece and/or a tool in a machine tool. The method comprises clamping a work piece at the machine tool, subsequently inserting the tool into a rotatable spindle shaft directly or via a tool holder, and rotating the spindle shaft. The method also comprises applying an electrical voltage between the work piece and the tool and displacing the tool and the work piece with respect to one another. If a contact occurs between the tool and the work piece, the method further comprises determining a change in the applied voltage or a resulting current flow between the work piece and the tool, and determining and recording the respective position of the work piece and/or the tool in a computing program for controlling and/or regulating the machining of the work piece.

The invention is based on the objective to develop a method for determining a position of a work piece and a tool in a machine tool which, while being characterized by a simple structure as well as an easy and cost-effectively manufacturability, avoids the disadvantages of the state of the art and facilitates an exact correlation between the geometry of the work piece and a tool.

It is thus desirable in the context of the objective that the work piece is probed with the rotating machining tool directly before machining. In this way, the positions of the geometry elements that determine the zero point, e.g. bores or edges, can be determined directly before machining with respect to the tool to be used. According to the invention, the effects described above, which may lead to inaccuracies as a result of the exchange of an automatic probing device for a machining tool as it is performed according to the state of the art, can be eliminated.

What is thus created according to the invention is a method for determining a position of a work piece relative to a tool in a machine tool, in which a work piece is clamped at a machine tool, in which a tool is subsequently inserted into a rotatable spindle shaft and the spindle shaft is set into rotation, in which an electrical voltage is applied between the work piece and the tool, in which the tool and the work piece are displaced with respect to one another, and in which a change in the applied voltage or in the resulting current flow is detected in the event of a contact between the tool and the work piece, and the respective position of the work piece and/or of the tool is determined and recorded in a computing program for controlling/regulating the machining of the work piece.

In practice, the geometry elements determining the zero point that are probed at the work piece in a machine before the machining procedure are often already finished. Therefore, it must be ensured that they are not damaged in the course of the probing process, which is indeed the case with the method known from the state of the art with the automatic probing device. The sampling pressure of the tracer pin is very low, so that the probing process does not leave any traces.

If, however, the sampling is supposed to be carried out with the rotating machining tool, an intrusion and material removal occur immediately as the work piece is touched. In order to avoid or at least minimize that, it is provided according to the invention that even a first minimal contact between the machining tool and the work piece is reliably detected, and that the machine tool is immediately stopped or even retracted.

Thus, it is provided according to the invention that a voltage is applied and monitored between the machining tool and the work piece. This is possible without any problems with modern machine tools having high-speed spindles, since the spindle shafts of such spindles are usually mounted with ceramic balls. In this way, the spindle shaft is electrically insulated from the machine. An electrical voltage can be applied to the spindle shaft through a contact as it is known from the state of the art, for example through brushes. It is guided into the machining tool via the tool holder. The second pole of the voltage can be connected to the work piece or the machine table that is located below the same.

If a spindle having a shaft that is not electrically insulated from the spindle housing is inserted into the machine, the electrical insulation may be provided at another suitable location, e.g. between the spindle housing and the machine, but also at the side of the work piece, e.g. between the work piece and the machine table. The preconditions for applying an electrical voltage between the spindle shaft and the work piece can be easily created by means of many known methods.

The machining tool is directly connected to the spindle shaft in an electrically conducting manner via the metallic tool holder inside of which it is held. If now a contact is established between the machining tool and the work piece, a current starts flowing and can be easily detected with the help of a simple circuit based on the varying electrical voltage. Also, such a change in voltage can already be detected in the event of an extremely short contact between the work piece and the machining tool. If a signal to immediately stop or retract the machine tool is sent to the control in the moment of a voltage change which is caused by the contact between the machining tool and the work piece, a significant intrusion, i.e. a damage to the work piece, can be safely prevented. If the probing speed is selected in a suitable manner, the resulting "probing marks" are considerably smaller than 1 meter. In practice, such small changes to the surface to be probed can be neglected and can be accepted also when it comes to already finished geometry elements of the work piece, even in the case that the is performed repeatedly. Thus, the described method is suitable for an almost damage-free probing of work pieces directly with the machining tool that is to be used for machining. Possible inaccuracies that are created by using an auxiliary device, such as an automatic probing device, are avoided.

The method can be used for machining tools with geometrically defined cutting edges, e.g. milling tools, as well as with non-geometrically defined cutting edges, e.g. grinding tools. The only precondition for the method is that the machining tool is electrically conducting, as well. Another great advantage of the probing according to the invention directly with the machining tool is that it can be performed at any time during machining. In practice, machine tools are often not zero point stable, in particular when it comes to longer machining processes, i.e. the position of the zero point is slightly changed. Most often, the change of the zero point is caused by thermal effects, either in the machine tool, e.g. through certain components being heated up, or through the environment, e.g. temperature variations of the air surrounding the machine tool. The change of the zero point during machining leads to undesired deviations. In order to minimize this effect, the method according to the invention makes it possible to repeat the probing process at predefined geometry elements at any time during the machining. Here, it is a great advantage that the machining tool does not have to be exchanged, but rather the probing can be carried out directly with the same. In this manner, the probing is rendered very time effective. It is understood that the geometry elements to be probed have to be cleaned before probing, e.g. with a cooling agent that is present inside the machine tool, in order to avoid faulty measurements due to shavings that are stuck to the work piece. This zero point correcting probing process can be performed at any desired time interval, depending on how zero point stable the machine tool is, and on what degree of precision is required.

It is particularly advantageous if the electrical voltage is an AC voltage, and the AC voltage is transferred from a voltage source to the tool by means of a capacitive coupling. Here, a first pole of the voltage source is coupled to the work piece, and a second pole of the voltage source is coupled to the tool via the capacitive coupling. In this manner, a mechanical contacting, for example through sliding contacts, is avoided between the elements that are set into rotation and the voltage source. In this way, the disadvantages as they are known in such mechanical contacting, such as for example signs of wear and tear, are prevented. What is realized instead of the mechanical contacting is a capacitive coupling, wherein at least one of the elements that are set into rotation, the spindle shaft, the tool holder or the tool, acts as a side of a capacitor, and a coupling element on the side of the voltage source, for example a metal plate that is arranged close to one of the rotating elements with a defined gap, acts as a second side of the capacitor. The higher the frequency of the applied AC voltage, the lower the resistance of the capacitor that is thus realized. Moreover, it can be ensured through a corresponding arrangement, e.g. through the selection of a sufficiently large metal plate and a small distance to the spindle shaft, that the capacity is correspondingly high, so that the electrical resistance is correspondingly low for the selected AC voltage.

If probing with the tool is performed at the work piece, a stronger current flow occurs only if a mechanical contact is created or if the distance between the tool and the work piece is only extremely small, even if an AC voltage is used. This is due to the fact that the surface of the used tools is not planar enough to form a significant capacitive coupling to the work piece. In machining tools, what protrudes are always only the individual cutting edges, where a close distance to the work piece to be probed can only be created in a point-shaped or line-shaped form, but never as a larger surface area, such as in capacitive coupling of the current source to the rotating elements in and at the spindle. Compared to the capacitive coupling of the current source to the rotating elements, for example by means of a planar metal plate, the capacitive coupling of the tool to the work piece is very small, even at a short distance from the mechanical contact.

A contact between the tool and the work piece can be a physical contact as well as an electrical contact. Here, an electrical contact is also present in the case that while only a very small gap remains between the tool and the work piece, there is still a current flow due to capacitive effects.

Since the gap between the tool and the work piece has to be extremely small for a significant capacitive coupling to be created, the effect is of subordinate significance for the measurement result, with the deviation from the mechanical contact being minimal.

In the following, a further possibility of contacting the spindle shaft is shown as an alternative to the already described solutions with the brush contact or the capacitor principle. Here, another auxiliary ball bearing, which is embodied with steel balls instead of with electrically insulating ceramic balls and is therefore electrically conducting, is mounted onto the spindle shaft. Because of the steel balls, the auxiliary ball bearing only reaches the same rotational speeds as the main bearings of the spindle shaft if the diameter of the steel ball bearing is considerably smaller. It therefore has to be mounted at a lean position, e.g. at the end of the spindle shaft. Its only function is to establish an electrical contact to the spindle shaft, and it does not have to additionally support the spindle shaft in a mechanical manner. Therefore, it can be a deep groove ball bearing of a simple design, for example. The outer ring of the bearing is received in an electrically insulating material, e.g. a plastic material, and is in this way electrically insulated from the spindle housing. At the same time, a cable is electrically connected with the outer ring of the bearing and guided out of the spindle. This cable can be connected to a pole of the voltage source. In this manner, the spindle shaft is connected to the pole of the voltage source with the help of the electrically conducting auxiliary ball bearing, as it is required for the method according to the invention. The advantage of this contacting is that it is still possible to work with the electrically simpler DC voltage, and that the auxiliary ball bearing has a longer service life than the brush contacts, which are subject to wear and tear as a result of constant friction. Above, the method according to the invention has first been described with respect to the fact that a correlation between the tool and the work piece is realized by means of probing, and that the exact site of this correlation and contacting is stored and taken into account in the machining program for the further machining of the work piece.

In the following, further aspects according to the invention as they follow from the method according to the invention are described.

The shavings that are removed during the machining, for example by milling or sanding, are distributed in the work space as a result of the process. A portion of the shavings also adhere to work piece. In some applications, attempts are made to keep the shavings away or remove them from the work piece by rinsing with a lubricant or a cooling lubricant, for example an emulsion or an oil. However, this is never entirely successful. Depending on the geometry of the work piece, on the machining as well as on the resulting trajectory of the shavings, the shavings repeatedly accumulate on the work piece. If a lubricant or a cooling lubricant is used, the adhesion of the shavings at the work piece is even supported. The shavings adhere to the work piece. Adhesion of shavings at the work piece is also supported if the work piece is made of a ferrous material and clamped with a magnetic plate. The field lines of the magnetic plate penetrate the work piece and result in magnetic cohesion of the removed shavings. In the method according to the invention, where the work piece is probed with a rotating tool by means of a current contact to be detected, the shavings adhering to the work piece can cause some interference. Through shavings than adhere to the work piece, a contact between the work piece and the tool can already be created before the rotating tool touches the actual work piece, thus establishing a current contact. In this scenario, the adhering shavings turn into a conductor that provides an electrical connection between the work piece and the tool.

The result is a faulty measurement, since the actual position for the contact between the work piece and the tool has not yet been reached. According to the approach described above, a faulty position for the contact point may possibly be determined, with the subsequent machining steps being based on incorrectly determined data, which may lead to considerable damages that may even result in the destruction of the work piece.

Unfortunately, in practice the adhesion of shavings at work pieces cannot be completely avoided, as described above. In order to carry out a reliable contact measurement, the work piece would have to be cleaned by hand and checked for cleanness prior to each measurement. In particular when it comes to automated machining processes, this represents an undesirable manual intervention.

Thus, it is provided according to the invention that a repeated measurement, at least a double measurement, is performed for determining a contact point between the work piece and the tool to be probed. If shavings are present during the contact measurement as conducting elements between the tool and the work piece, as described above, the shavings receive an impulse through the rotation of the tool at the moment of contact, i.e. as the shavings adhering to the work piece and the tool touch each other, with that impulse considerably changing the position of the shavings and usually shaking them off of the work piece.

It is provided according to the invention that the displacement direction of the tool relative to the work piece in which these are moved towards each other is immediately reversed in the moment of the electrical contact in order to avoid any damage to the work piece. The tool is removed again from the work piece. The trajectory on which the tool is thus removed from the work piece to a safe distance position can be preset in any desired manner.

According to the invention, a further (second) contact measurement can be carried out immediately from the safe distance position by once more moving the tool towards the work piece on exactly the same trajectory on which it has been previously removed from the work piece until a contact is established once again. If the tool has probed the work piece correctly already in the first contact measurement, the same contact position for the tool relative to the work piece will be determined in the second contact measurement with the precision of the measuring tolerance of the measuring method itself.

If, however, shavings were present as electrical conductors between the tool and the work piece in the first contact measurement, the second contact measurement will result in a different contact position for the tool relative to the work piece, since the position of the shavings has been changed by the rotating tool in the first contact measurement. Consequently, this will result in a greater difference between the contact positions of the first contact measurement and the second contact measurement. Based on this greater difference, the machine control processing the results of the contact measurements can determine that the first measurement must have been a faulty measurement.

If the difference between the two contact measurements thus exceeds a predefined tolerance value (as set by the user or permanently recorded in the control), there is the possibility to assess only the second contact measurement in the control to be correct, and to dismiss the first one because it was faulty as a result of adhering shavings.

In order to further increase the reliability of the contact measurement, it is also possible to perform a further (third) contact measurement in the above described manner if the predefined tolerance value is exceeded. Again, the difference between the second and the third contact measurement can subsequently be compared to a predefined tolerance value, and based on that it can be inferred whether these two measurements were both the result of the desired direct contact between the work piece and the tool, or whether the measurement has been corrupted by adhering shavings. In the latter case, further contact measurements can be carried out until two consecutive contact measurements lie within the predefined tolerance.

According to the invention, it is possible to perform a reliable contact measurement between the work piece and the tool in this manner also in the event of larger shaving accumulations.

When it comes to very small shavings, it can be advantageous to increase the predefined number of consecutive contact measurements that should lie within a predefined tolerance to more than 2 contact measurements in one location. This renders the method even more reliable—even as that is at the expense of the measuring time.

It is understood that this approach according to the invention works for any desired sampling direction. Shavings can adhere to even, tilted or also perpendicular areas of the work piece. Moreover, it may be expedient to remove larger accumulations of shavings in advance with the help of media that are present in the machine, e.g. strong air nozzles, and also lubricants or cooling lubricants. In this manner, the number of contact measurements that are required until two consecutive measurements lie within the predefined tolerance is reduced. It does not take very long for all shavings to be removed. Here, the cleaning process with the media can be performed in a targeted manner at the sites that are provided for the contact measurement. It is understood that the invention is suitable for grinding as well as for milling tools, i.e. for tools with defined and non-defined cutting edges.

When it comes to work processes with very low rotational speeds, it can be advantageous to slightly increase the rotational speed for the contact measurement, so that, in the event of an electrical contact via a shaving (faulty measurement), it is ensured that the latter receives a sufficiently strong impulse to be shaken off.

Moreover, it is possible according to the invention to create a redundancy of contact measurements by probing the work piece at multiple different positions either once or multiple times as described, and by comparing the results of these measurements to each other. If the measurement results of the contact measurements in one position of the work piece do not fit the other contact measurements, for example if they exceed a predefined tolerance/deviation, the results of the contact measurement(s) can be dismissed as invalid at this one position and excluded from being taken into account for further machining.

This approach can also be used if, as described, multiple contact measurements are initially required at different positions of the work piece in order to carry out a measurement in the first place, for example in order to determine the position and orientation of the work piece relative to the machine tool. Through a correspondingly increased number of contact measurements it is always possible to create a redundancy by which faulty measurements caused by shavings are detected and excluded from being taken into account.

In the case of faulty measurement caused by shavings, a contact is generally determined too early, i.e. before the sought contact position between the work piece and the tool has been reached. The adhering shavings establish the contact already before that. This fact can be used for determining faulty measurements as a result of shavings. In such cases, the rotating tool always has a distance to the actual work piece.

The probing with the rotating tool at the work piece can also be used for the indirect geometry measurement of the tool, namely by probing already finished, dimensionally known geometry elements at the work piece, e.g. the high-precision work piece surface or a high-precision pilot hole that have previously been measured on a measuring machine. If a pilot hole is probed multiple times by means of similar methods as when measuring the bore with an automatic probing device with the tool, for example based on facing measuring points, the effective diameter of the tool can be calculated by using the determined sampling points, if the bore diameter is known. The tool length can be determined by probing the known work piece surface. The probing is performed with the set rotation speed as it is provided for the subsequent machining. Prior to the probing of the work piece, it is possible to let a warm-up phase pass, following which the machine tool is in the thermally stable state for the machining rotation speed. In this way, thermally caused inaccuracies by probing with a stationary automatic probing device according to the state of the art and subsequent machining with a rotating tool are avoided.

Control measurements are possible at any time during machining by means of renewed probing in order to detect any shifts between the work piece and the tool that are caused by changes in the ambient temperature of the machine tool or other influences, and to compensate for them based on the probing results. At that, no exchange of an automatic probing device is required. The tool remains in the spindle at rotational speed. The machine tool remains thermally stable. Through repeated probing of the rotating tool at the work piece at defined geometry elements with known dimensions, the wear and tear of the tool can be detected during the machining. For example, if facing measuring points are repeatedly chosen inside a pilot hole, the sampling points will be located, depending on the wear and tear, at a greater distance in the case of a tool diameter that is reduced due to wear and tear. If the measuring points are compared to the values of the first probing, the wear and tear of the tool can be determined. The same is true for the length of the tool and also the radius.

After the work process has been concluded, the milled geometry can be examined directly with the machining tool. For this purpose, the tool can again be referenced beforehand at geometry elements at the work piece that have known dimensions, i.e. the wear and tear can be determined. Thus, it can for example be detected whether, in particular with longer tool lengths, the tool has been pressed away during the machining due to cutting forces or has been driven into the work piece as a result of an unfavorable cutting edge geometry, so that deviations in the machining have occurred.

In work pieces with complex surfaces, the machining often has to be carried out with tools of different sizes. For time reasons, as many areas of the work piece surface as possible are machined with large tools. In concave areas with small inner radiuses, the machining cannot be completed with large tools, so that some material remains. Residual material machining is therefore performed with a considerably smaller tool. If the positioning of the residual material machining with the small tool is not exactly matched, undesired recesses are created in the manufactured work piece surface between the area that has been processed with the larger tool and the area that is processed with a smaller tool for the purpose of residual material machining. According to the invention, it is possible that, prior the residual material machining with the small tool, the work piece surface that has already been finished with the large tool is probed with the rotating small tool in the direct environment of the residual material machining, and that the residual material machining with the small tool is exactly aligned with the work piece surface that has been finished with the large tool in the direct environment of the residual material machining. Here, it is not only possible to perform the alignment through translational displacement, but where necessary to also carry out an additional torsion in space, so that the residual material machining is matched to the already manufactured surface as perfectly as possible. Such alignment processes are known from the state of the art as so-called "best fit methods".

It is also possible to perform probing at additional probing elements (reference elements) that are firmly installed at the machine table, as known from DE102009037593A1. Instead of using an automatic probing device, the probing procedures at the reference elements that are described in DE102009037593A1 can also be performed with the rotating tool according to the invention. Such dimensionally known reference elements in the machine tool can also be used for measuring the geometry of the rotating tool by means of probing. If the probing according to the invention cannot be carried out in a completely wear-free manner, for example because the machine tool does not react quickly enough, the firmly installed reference elements can also be provided to be replaceable.

For calibrating an automatic probing device, a high-precision sphere with known dimensions can be used, for example. The latter is probed multiple times with the probing device, and the switching characteristic of the probing device is determined in this manner. Such known spheres can also be used in the machine as firmly installed probing elements for the method according to the invention.

In a further design variant of the invention, it is provided that during the often very long machining time, e.g. in a finishing machining where the individual rows can be positioned very close to one other, the contact of the work piece to the tool is continuously monitored during the machining procedure. There has to be an electrical contact between the tool and the work piece during every cutting procedure, i.e. multiple times per revolution of the tool. The number of contacts per revolution depends on the number of the cutting edges provided at the tool. If this continuous contact is no longer present, this may be an indication that the tool has broken off. If there are less contacts per revolution of the tool than there are cutting edges, it may be inferred that individual cutting edges have broken off. Since the rotational speed of the tool for the machining procedure and the number of the cutting edges of the used tool are known in the control, such an examination as to whether all cutting edges of the tool are in mesh is easily possible. The tool breakage control according to the invention is very advantageous in particular for machining with very thin tools that are very sensitive. According to the state of the art, the tool is measured only at the end of the machining in an auxiliary device, e.g. a measuring laser. If the tool brakes off prematurely, many hours of machining time may be lost in this way before this fact is noticed. In a continuous monitoring by means of a current contact according to the invention, a tool breakage can be immediately monitored. Here, it must be kept in mind that there are also often transmission movements in the NC programs that are to be executed, for example from one machining position to the next. Of course, there is also no contact between the tool and the work piece during the transmission movement. However, these transmission movements can be distinguished in the NC program of the machine tool, e.g. through a different, higher infeed. Accordingly, the machine control will expect the contact to the work piece only during the actual machining, e.g. with the predefined machining infeed, and will examine the contact of the tool to the work piece only during the execution of these program parts. In this manner, it is avoided that tool breakage is wrongly detected during a transmission movement that represents a part of the program. Moreover, in NC programs there is often a run-up movement to the work piece which is already carried out with the machining infeed in order to slowly bring the tool in mesh. For such cases, a waiting period can be provided at the beginning of the program and after each transmission movement, with the contact examination according to the invention beginning only after this waiting period. Here, the waiting period is chosen to be long enough to allow for the run-up movement to be safely completed within it. What is important in this approach is that the meshing of individual cutting edges can also be monitored.

In the context of the invention, the term "probing" as used in the above descriptions refers to a contacting between the work piece and the tool, as has been described above. The invention can be used with grinding tools as well as with milling tools, i.e. both with tools that have defined and tools that have non-defined cutting edges.

BRIEF DESCRIPTION OF THE DRAWINGS

The invention is described in the following based on exemplary embodiments in connection with the drawing. Herein.

DETAILED DESCRIPTION

Figure 1:
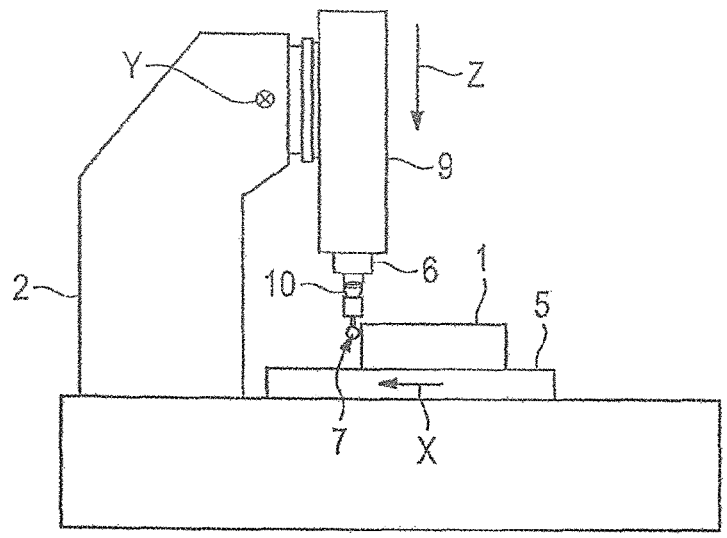
FIG. 1 shows a simplified rendering of a machine tool with a probing device according to the state of the art.

FIG. 1 shows a simplified side view of a machine tool 1 that is embodied as a milling machine according to the state of the art. A work piece 1 is positioned on the machine table 5, which can be displaced in an X-axis in the arrow direction. A milling spindle 6 is mounted inside a Z-axis 9 that can be displaced in two axes (Y and Z). An automatic probing device 7 as it is known from the state of the art is held at the milling spindle 6 by means of a tool holder 10.

A tracer pin is positioned at the bottom of the probing device 7, with a sphere being attached at its end. When the machine displaces the machine table 5 in the arrow direction X, the sphere of the tracer pin touches the work piece 1 first, and the tracer pin is deflected as a result. When a defined deflection path is reached, the automatic probing device 7 switches and sends a signal to the control. At that moment, the position of the axes is detected in the control, and the position of the work piece 1 on the machine table 5 is determined in this manner.

Figure 2:
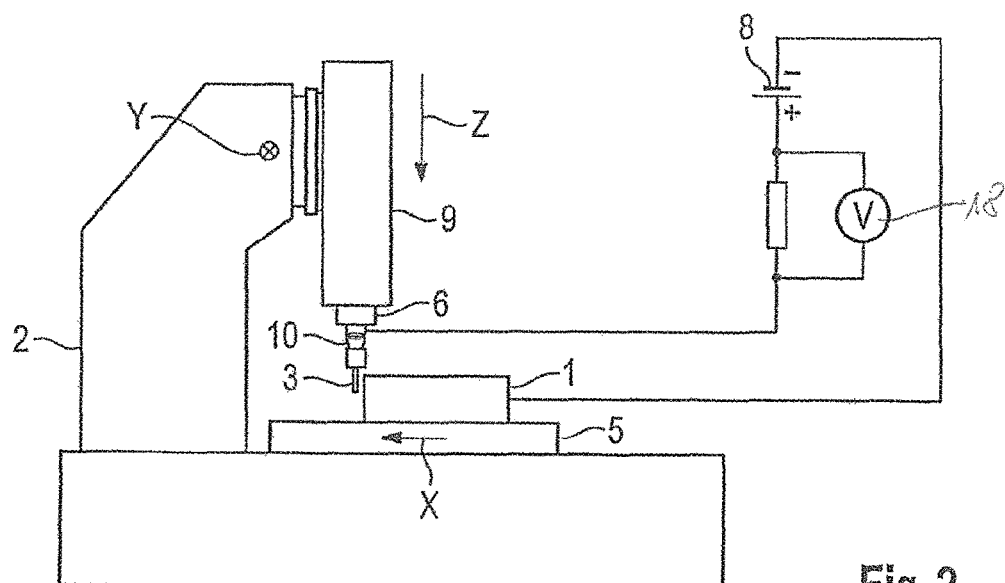
FIG. 2 shows a rendering of a first exemplary embodiment according to the invention that is analogous to FIG. 1.

FIG. 2 shows the method according to the invention based on a first exemplary embodiment. Instead of the automatic probing device 7, a machining tool 3 (milling tool) is positioned in a tool holder 10, which is in turn mounted at the spindle shaft 4 of the milling spindle 6. The machine table 5 is also displaced in the arrow direction X for the purpose of probing with the machining tool 3 at the work piece 1. The tool 3 rotates during the probing process, so that a bounding volume defined by the cutting edges of the tool 3 is formed. Through suitable means, for example brushes, a voltage is applied to the spindle shaft 4 (not shown) or the tool holder 10 by means of a voltage source 8, which is shown here by way of example as a DC voltage source. The second pole of the voltage source is connected to the work piece 1. Since, in fast-rotating milling spindles 6, the spindle shaft 4 is mounted in the milling spindle 6 with ceramic ball bearings, the spindle shaft 4 is electrically insulated from the housing of the milling spindle 6. There is no current flow as long as the machining tool 3 does not touch the work piece 1, because the current circuit is not closed. When the machine table 5 with the work piece 1 is displaced in the direction of the machining tool 3 in the arrow direction, a mechanical contact occurs at some point between the machining tool 3 and the work piece 1. As a result, the current circuit is closed. In the circuit, which is described in an exemplary manner, an electrical resistor is additionally connected in series with the voltage source 8. As long as there is no contact between the machining tool 3 and the work piece 1, there is no electrical voltage drop at the resistance, since the current circuit is not closed. As the work piece 1 and the machining tool 3 touch each other, the current circuit is closed, a current flows via the resistance and thus a voltage drops at the same. This voltage drop can be detected at the moment the touching occurs by means of a circuit as it is known form the state of the art. The control immediately stops the axis with the work piece 1, so that no material removal occurs at the work piece 1 apart from the touching of the machining tool 3 and the work piece 1. Instead of the axis being stopped, it is also possible to initiate an immediate reversing process of the axis with the machine table 5, which removes the work piece 1 from the machining tool 3. At the moment when the change in voltage occurs due to the contact between the machining tool 3 and the work piece 1, the position of the machine axes is detected, and thus the position of the work piece 1 on the machine table 5 is determined.

It is to be understood that the circuit is shown only in an exemplary manner. An alternating current source can equally be used.

The machining tool 3 can also be directly clamped in the spindle shaft 4.

Figure 3:
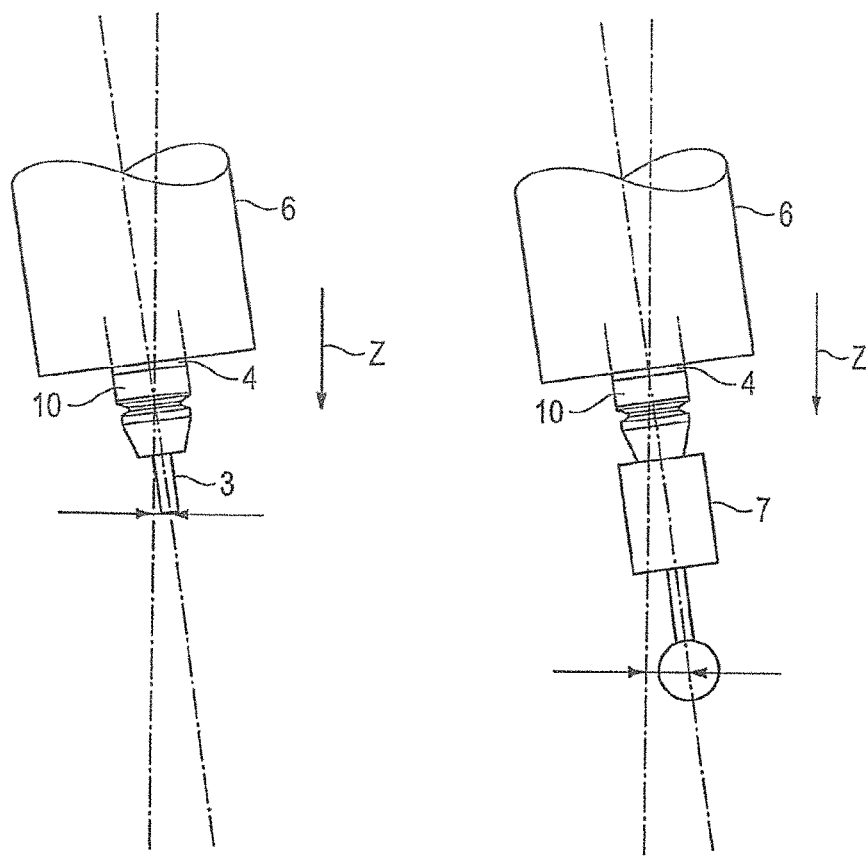
FIG. 3 shows renderings of angular errors of the milling spindle as well as errors resulting therefrom.

FIG. 3 shows what effect a tilted position of the milling spindle 6 with respect to the displacement direction of the vertical axis Z has. The rendering is strongly exaggerated to make the effect clear.

What can be seen in the left view of FIG. 3 is the milling spindle 6 with a tool holder 10 and a relatively short machining tool 3 according to the method according to the invention. A deviation results at the tool tip due to the tilted position with respect to the lower edge of the milling spindle 6.

In the right view of the milling spindle 6 it is shown for the same tilted position of the milling spindle 6, i.e. the same angular error of the milling spindle 6, what effect the tilted position has on an automatic probing device 7 according to the state of the art that is mounted at the milling spindle 6 by means of a tool holder 10.

As a comparison of the two renderings of FIG. 3 shows, a distinctly larger deviation results from the considerably larger distance of the probing ball to the lower edge of the milling spindle 6 in the right view as compared to the distance of the tool tip to the lower edge of the milling spindle 6 in the left view. If now a work piece 1 is probed in the way as it is described in FIG. 1 with an automatic probing device at such a tilted position of the milling spindle 6 and is subsequently processed with a shorter machining tool as it is shown in the left view of FIG. 3, an offset is created that results from the difference between the indicated dimension arrow heads. This leads to undesired inaccuracies in the machining procedure. However, if the work piece 1 according to the invention can be probed directly with the machining tool 3, this offset can be avoided. Thus, the method according to the invention can be performed in a fully automated manner, wherein the contact between the work piece and the tool can also be realized at the beginning of machining, or also in a cyclical and automated manner during machining. Here, the data of the underlying machining programs are respectively supplemented or calibrated.

Figure 4:
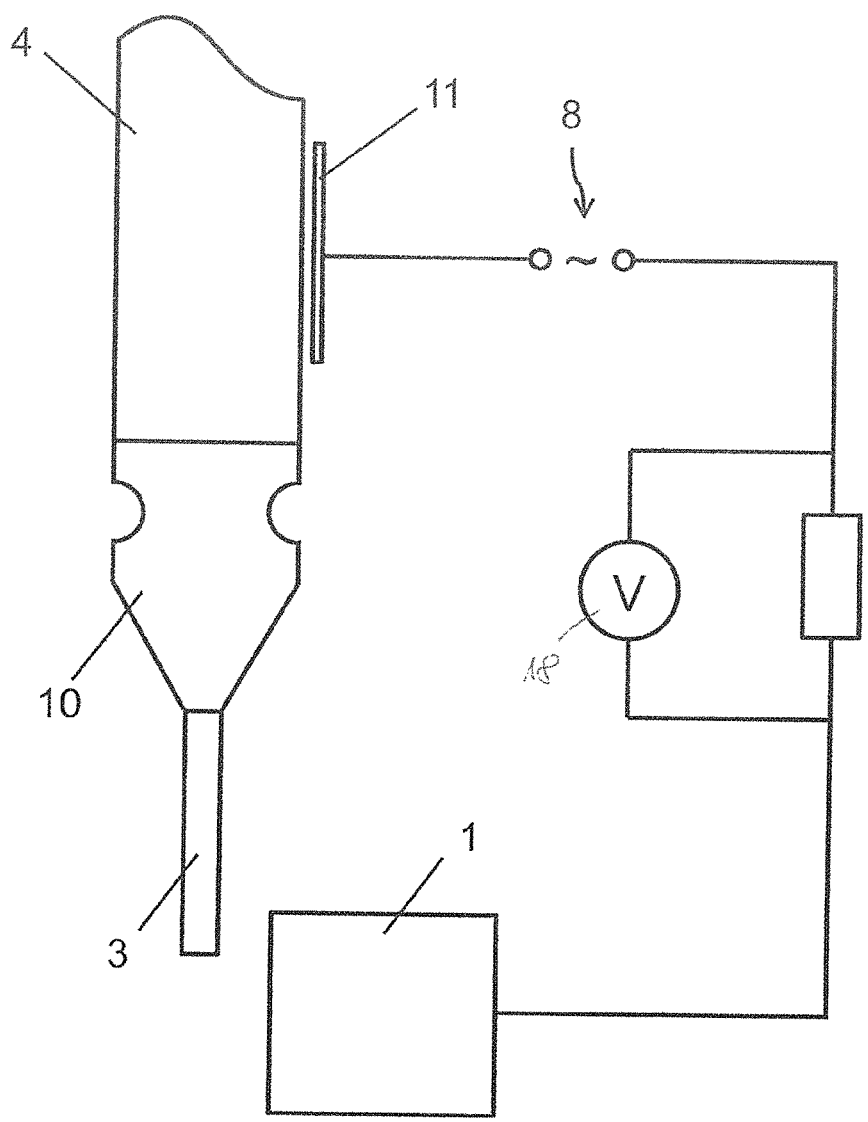
FIG. 4 shows a rendering of a further exemplary embodiment with a capacitive coupling according to the invention.

FIG. 4 shows an exemplary embodiment of a capacitive coupling of the voltage source 8 and the tool 3 according to a further exemplary embodiment. For this purpose, the voltage source 8 is embodied as an AC voltage source. The tool 3 is connected in an electrically conducting manner to the spindle shaft 4 via the tool holder 10. A metallic plate 11 is arranged along a surface of the spindle shaft 4, with its surface being arranged in such a manner along the surface of the spindle shaft 4 that a gap of constant width is created between the spindle shaft 4 and the metallic plate 11. The metallic plate 1 is connected in an electrically conducting manner to the first pole of the voltage source 8. As previously described, a second pole of the voltage source 8 is connected to the work piece 1 in an electrically conducting manner.

The metallic plate 11 forms a capacitor together with the spindle shaft 4, and thus facilitates a current flow if an AC voltage is provided by the voltage source 8 and a contact occurs between the work piece 1 and the tool 3. This current flow in turn leads to a voltage drop at the resistor, which can in turn be detected with a circuit as it is known from the state of the art at the moment the touching occurs.

Figure 5:
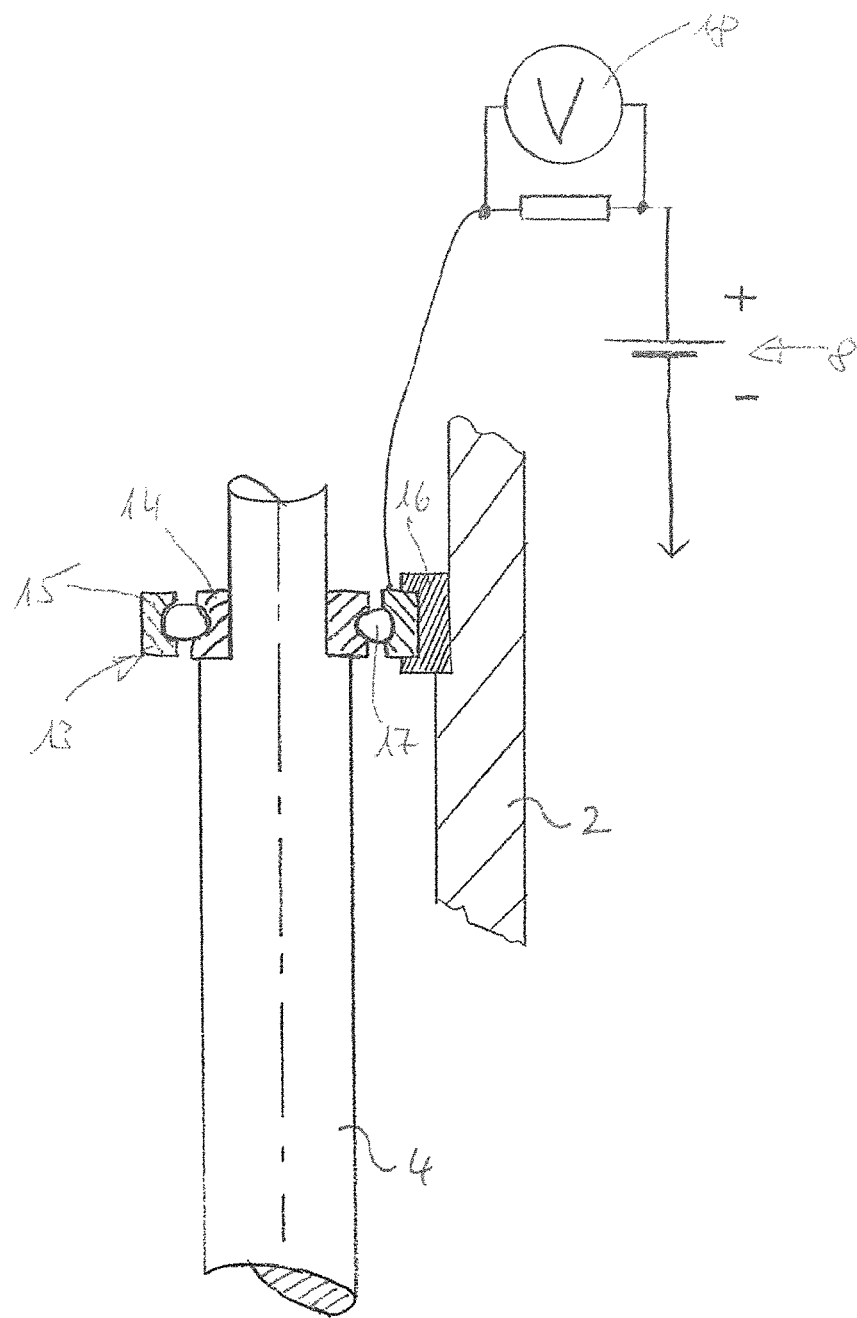
FIG. 5 shows a view of a further exemplary embodiment that is analogous to FIGS. 2 and 4.

In those embodiments of the invention where the voltage source 8 provides an AC voltage, already a minimal approach of the tool 3 towards the work piece 1 can be detected if the machine reacts to an electrical contact very quickly, since a capacitive element is also formed in such an approach by the tool 3 to the work piece 1, and thus an electrical contact occurs very shortly before the mechanical contact, and can also be determined based on a change in voltage. FIG. 5 shows a further exemplary embodiment for contacting the spindle shaft 4. An auxiliary ball bearing 13 is mounted at one area of the spindle shaft 4, preferably at the upper end area of the spindle shaft 4, and comprises electrically conducting steel balls 17 that are arranged between an inner ring 14 and an outer ring 15. The outer ring 15 is mounted at the machine tool 2 by means of a preferably also ring-shaped insulation element 16. As shown, the outer ring 15 is connected to a voltage source 8, which is analogous to the structure of FIGS. 2 and/or 4. The negative pole of the voltage source 8 leads to a work piece 1 that is not shown in any more detail. The voltage source 8 is embodied as a DC voltage source. The structure comprises a voltage detector 8, as is likewise shown in FIGS. 2 and 4.

Figure 6:
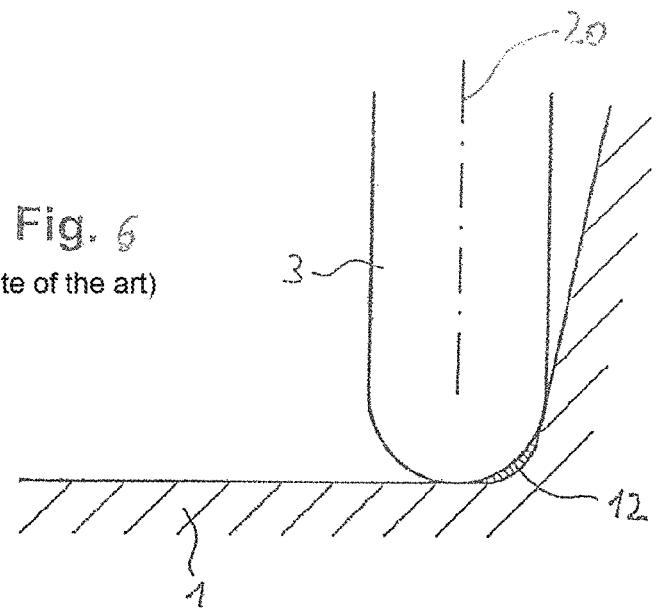
FIG. 6 shows a rendering of remaining residual material that occurs in machining of a concave surface area with a large tool.

FIG. 6 shows the remaining residual material 12 in the course of machining a concave work piece surface if the tool radius is considerably larger than the inner radius of the work piece 1.

Figure 7:
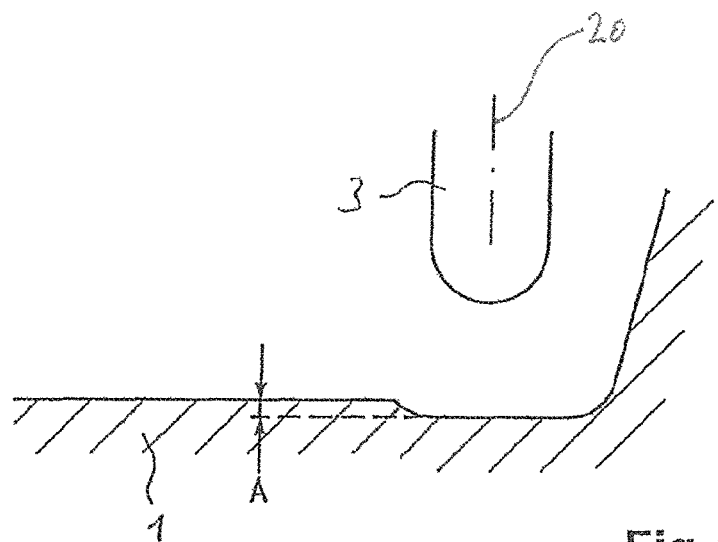
FIG. 7 shows a rendering of an undesired recess in the work piece surface following residual material machining with a small tool.

FIG. 7 shows the resulting recess on the work piece surface if the machining of the residual material with a small tool 3 in a partial area of the work piece 1 has been slightly too deep. What results is an undesired recess "A" on the surface.

Figure 8:
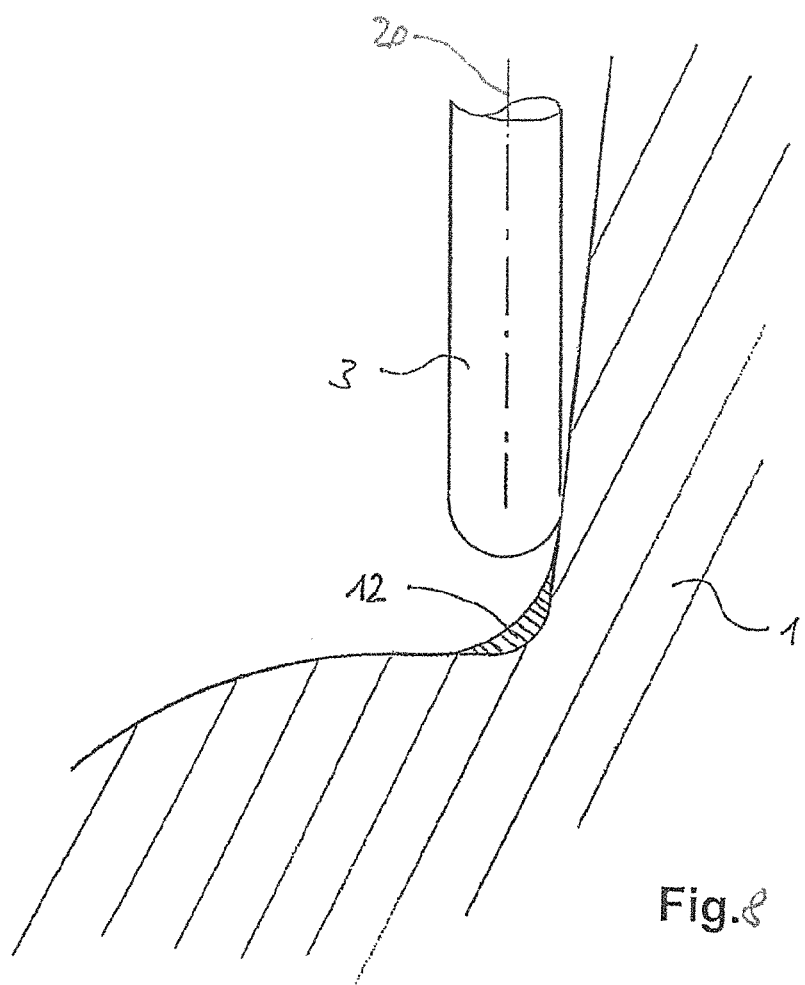
FIG. 8 shows a rendering of the probing with the rotating tool before a residual material machining is performed.
Figure 9:
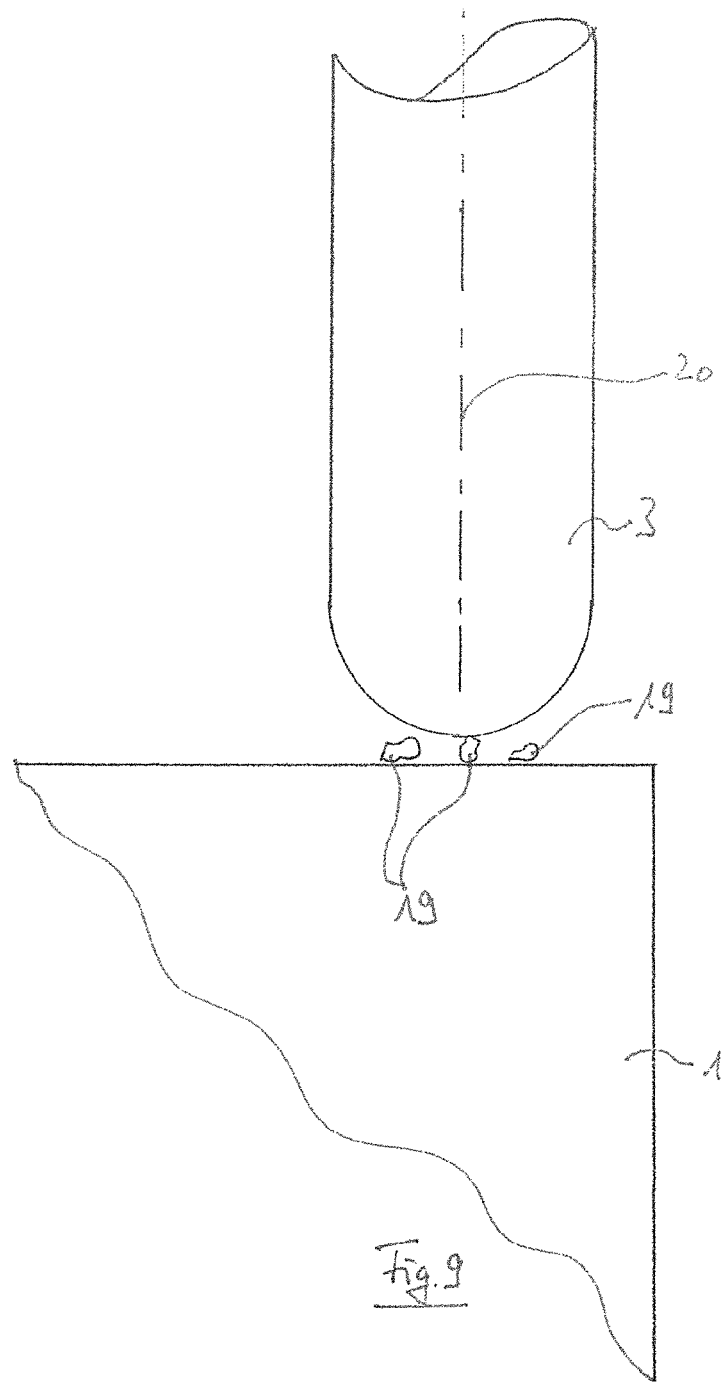
FIGS. 9-11 show schematic renderings of the contacting of the work piece and the tool, with shavings being present.
Figure 10:
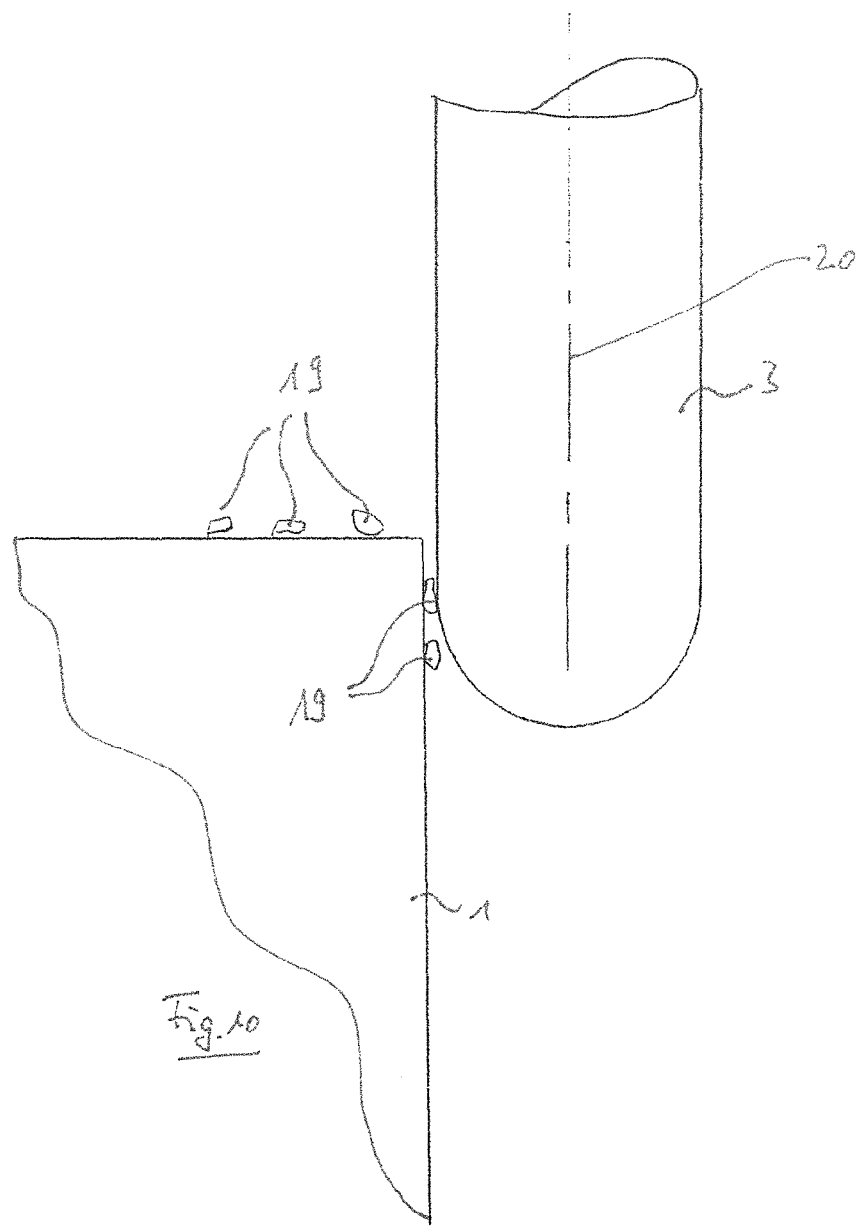
Figure 11:
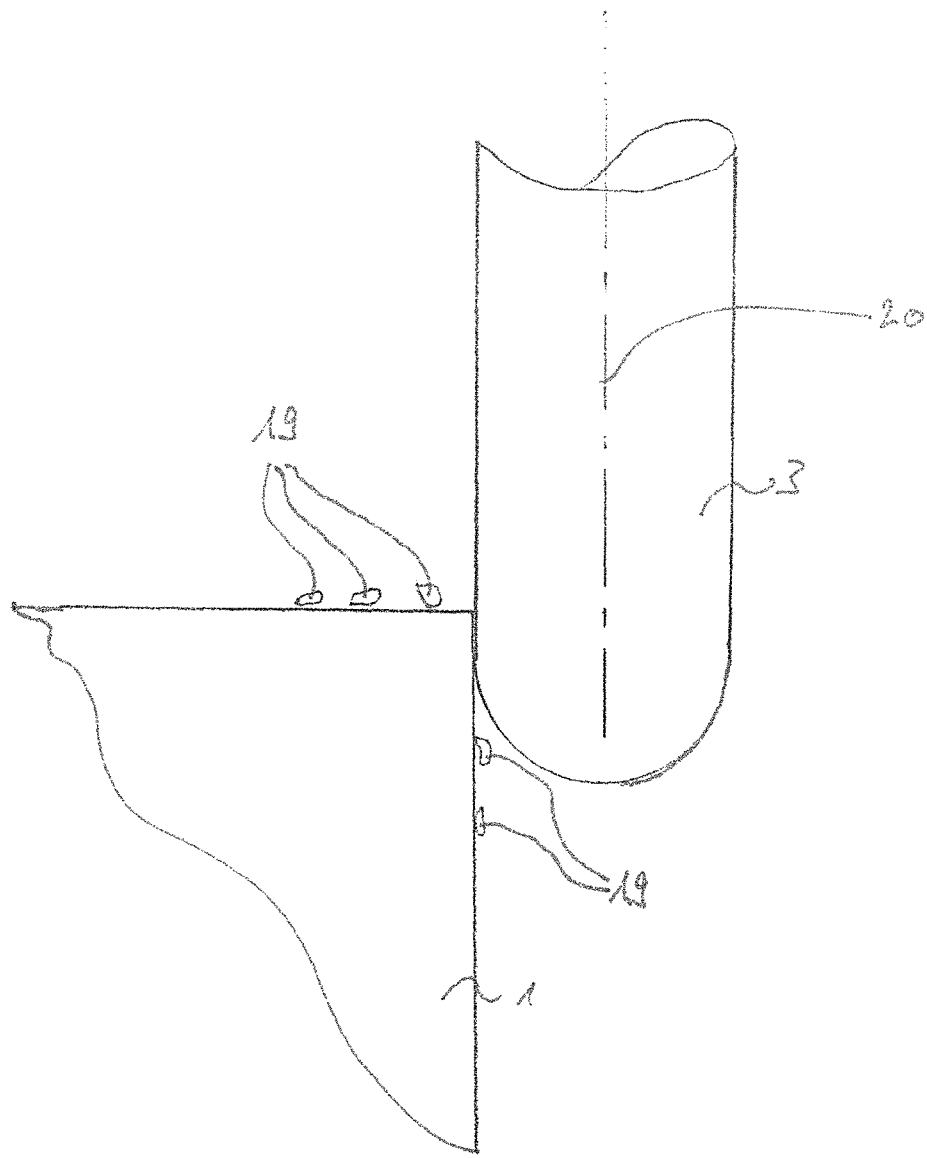

FIG. 8 shows how the work piece surface that has already been finished by a larger tool 3 is probed according to the invention with a small rotating tool 3 in the environment of a required residual material machining. In this manner, the position of the residual material machining that is to be carried out is optimally adjusted to the work piece 1 and the already created surfaces. FIGS. 9 to 11 show the approach according to the method according to the invention, in which shavings 19 are present between the work piece 1 and the tool 3 that is rotating around a rotational axis 20, with the shavings 19 adhering to the work piece 1. In FIGS. 9 and 10, it is explained that a contacting between the tool 3 and the work piece 1 may occur via the shavings 19. This contacting is faulty, as in reality the tool 3 is not in contact with the work piece 1, but rather has a distance to the same, with the distance corresponding to the thickness of the shavings 19. Thus, the machine control receives a faulty signal. This leads to a faulty measurement. In order to avoid such faulty measurements and errors, it is provided according to the invention that the work piece 1 is contacted by means of the tool 3 at least twice, as described above. Such a second contacting is shown in FIG. 11. In this second contacting, the tool 3 touches the work piece 1 in a correct manner, whereby an electrical current can flow or a voltage drop occurs, as has been described above. Just like the faulty contacting by the shavings 19, this effect is registered by the machine control. As described, the machine control takes into account the resulting difference in the distance between the tool 3 and the work piece 1, and subsequently carries out another contacting measurement. If that shows the same results as in the situation shown in FIG. 11, these values are taken as a basis and the values from the measuring situations of FIG. 10 are dismissed.

Figure 12:
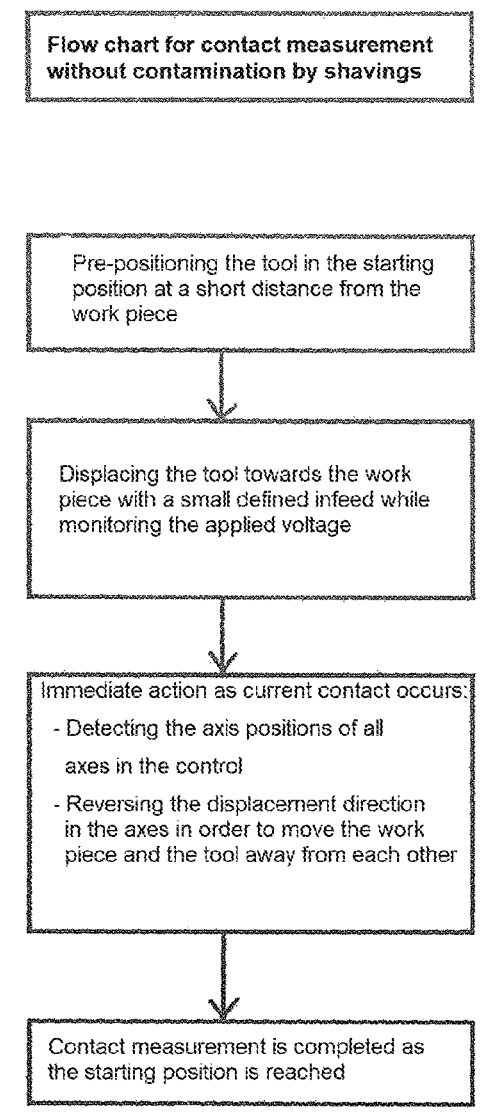
FIG. 12 shows a flow chart for contact measurement without shavings.

FIG. 12 shows a flow chart that illustrates the method steps according to the invention in a contact measurement without contamination by shavings. First, the tool is pre-positioned relative to the work piece, then the tool is displaced in the direction towards the work piece, namely with a small defined infeed. In the course of this process, the applied voltage is monitored. In the event of a current contact, immediate action is taken, namely a detection of the axis positions of all axes of the machine tool in the control as well as a reversion of the displacement direction of the tool relative to the work piece in the axes. Here, the tool can be displaced relative to the work piece in only one axis, for example the vertical z-axis, but it is also possible to displace the tool in all three axes of the machine tool relative to the work piece, that is, also the horizontal x-axis and y-axis. If the tool returns to its original starting position relative to the work piece, the contact measurement is completed. Then it can be determined in the machine control where in the work space the tool and the work piece are located relative to one another, whether the tool and/or the work piece are in the correct position, or whether the tool has the correct dimensions etc., as described above. In this way, a correction or calibration of the machining program is possible.

It is understood that, as shown in the Figures, the tool that is rotating about the rotational axis 20 is provided with multiple cutting edges. The rounded cylindrical rendering, in particular of FIGS. 9 to 11, thus shows the envelope curve resulting from the rotation of the tool. It is understood that a bounding volume would result in a three-dimensional rendering. It is formed by the points of the tool that are located in the radially most outward positions, in particular by the tool-cutting edges.

Figure 13:
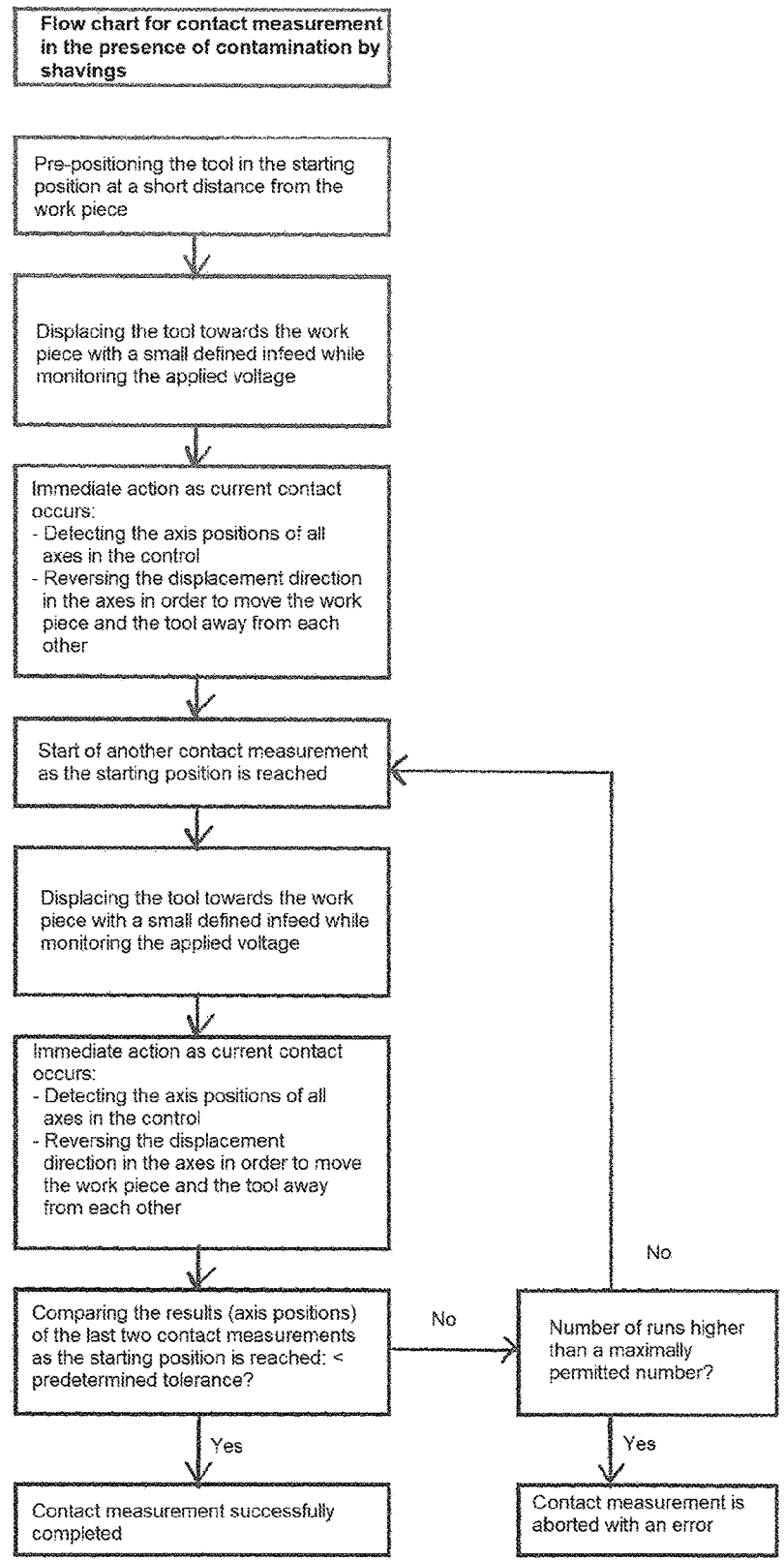
FIG. 13 shows a flow chart for contact measurement with shavings.

FIG. 13 shows a flow chart for a contact measurement in which the work piece 1 is contaminated by shavings 19, see FIGS. 9 to 11. Here, too, the tool is pre-positioned in a starting position relative to the work piece. Subsequently, the tool is displaced in the direction towards the work piece with a small defined infeed. The voltage is monitored. In the event of a current contact or a voltage drop, immediate action is taken, namely the detection of all axis positions by means of the machine control and a reversion of the displacement direction of the tool relative to the work piece in the respective axes in order to place the work piece at a distance from the tool. The contact measurement is completed when the initial position or the starting position of the tool has been reached. Up to this method step, the flow chart of FIG. 13 corresponds to the flow chart of FIG. 12. According to FIG. 13, the tool is subsequently displaced again with a small defined infeed in the direction towards the work piece. In the event of a current contact, again immediate action is taken, namely the detection of the axis positions and the reversion of the displacement direction of the tool relative to the work piece in the manner described above. The tool is again displaced relative to the work piece into its starting position. Afterwards, the results of the two measurements, namely the axis positions of the axes of the machine tool that have been detected during the contacting, are compared. Here, it is determined whether there are differences and whether they are smaller than a predefined tolerance. If they are smaller than a predefined tolerance, the contact measurement has been successfully completed, wherein for example a mean value of the two axis positions of each axis as detected during the two contacting procedures can be taken into account as the final measurement value. If the differences of the axis positions of the axes of the two contact measurements are larger than the predefined tolerance, it is examined whether the number of the contact measurements that have been carried out so far is higher than a maximally admissible number. If it is higher, the contact measurement is aborted with an error message. If it is lower, the program returns to a renewed second measurement. The contact measurement according to the invention it thus performed twice from the outset, and it is decided at the end of the second measurement whether the results of the two measurements lie within a predefined tolerance. If that is the case, the measurement is completed and is valid (YES). If that is not the case (NO), it is examined how many contact measurements have already been performed at the location. If the number is smaller/equal to the predefined maximally admissible number, a new contact measurement is carried out at the location. If the number of the previously performed contact measurements at the location is already larger than the predefined maximally admissible number, the contact measurement at the location is aborted with an error.

Figure 14:
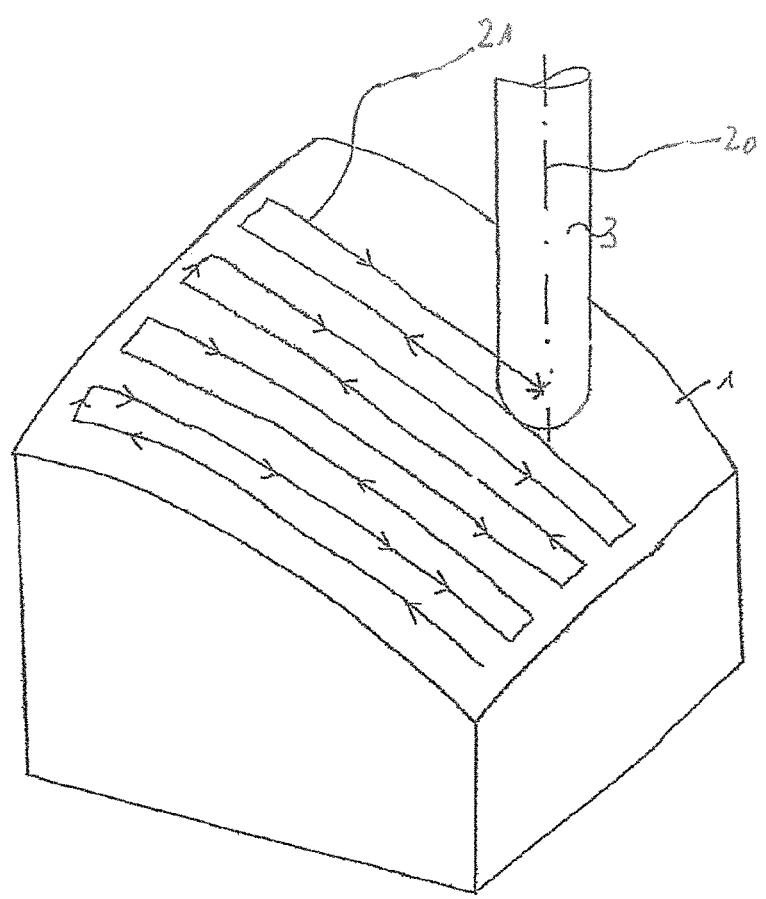
FIG. 14 shows a schematic rendering of the machining of a work piece by means of a tool.

In this manner, it is avoided that an infinite series of measurements is carried out in one location, possibly because some other error is present. FIG. 14 shows how the tool 3 is moved along the rows 21 with respect to the surface of the work piece 1 in the context of the contact measurement described above by means of which a tool breakage and/or cutting edge control is carried out. Thus, a continuous series of contacts between the work piece 1 and the tool 3 results as the rows 21 are passed, namely one contact with every cutting edge intrusion of the tool, i.e. there are as many contacts per tool revolution as the tool has cutting edges, which can be continuously checked and monitored according to the invention, as described above.

Various features of the invention are set forth in the following claims.

The invention claimed is:

1. A method for determining a position of a work piece and/or a tool in a machine tool, the method comprising:
   clamping a work piece at the machine tool;
   subsequently inserting the tool into a rotatable spindle shaft directly or via a tool holder;
   rotating the spindle shaft;
   applying an electrical voltage between the work piece and the tool;
   displacing the tool and the work piece with respect to one another;
   if a contact occurs between the tool and the work piece, determining a change in the applied voltage or a resulting current flow through the work piece and the tool; and
   determining and recording the respective position of the work piece and/or the tool for controlling and/or regulating the machining of the work piece,
   wherein determining the respective position of the work piece and/or the tool is made at surfaces of the work piece, which have been machined with a previously used tool, in an environment of a residual material machining to be performed with the tool,
   wherein the residual material machining is aligned with the tool by contacting the work piece at the surface machined with the previously used tool.

2. The method of claim 1, characterized in that the spindle shaft and/or the work piece are mounted in an electrically insulated manner.

3. The method of claim 1, further comprising stopping the relative movement between the work piece and the tool if a contact between the work piece and the tool is reached.

4. The method of claim 1, further comprising moving the work piece away from the tool if a contact between the work piece and the tool is reached, and after the position of the work piece and/or of the tool has been determined.

5. The method of claim 1, wherein the method is carried out at the beginning of a machining of a work piece.

6. The method of claim 1, wherein the method is carried out in time intervals during a machining of a work piece or after the machining of the work piece.

7. The method of claim 1, further comprising contacting the work piece with the tool in a damage-free manner.

8. The method of claim 1, further comprising cleaning the area of the work piece to be contacted by the tool is before any contact occurs.

9. The method of claim 1, wherein the method is carried out in an automated manner.

10. The method of claim 1, wherein the electrical voltage is an AC voltage, and further comprising transferring AC voltage from a voltage source to the tool by a capacitive coupling.

11. The method of claim 1, further comprising probing geometry elements of the work piece with known dimensions or reference elements installed in the machine tool with the rotating tool to determine the geometry and/or the wear and tear of the tool.

12. The method of claim 11, further comprising allowing a warm-up phase to pass until the machine tool is thermally stable before the probing of the work piece with the rotating tool is performed.

13. The method of claim 12, further comprising creating surfaces of the workpiece via a machining process with the tool, wherein probing of the work piece is performed after the machining process to perform dimensional control of the surfaces that are created with the tool.

14. The method of claim 1, further comprising:
   contacting the work piece at least twice by the tool;
   comparing the detected positional values; and
   repeating the contacting step between the work piece and the tool in the event that a difference of the positional values is present.

15. The method of claim 14, further comprising:
   comparing the difference to a predefined tolerance value; and
   repeating the contacting step between the work piece and the tool if the tolerance value is exceeded.

16. The method of claim 14, further comprising:
   determining a total number of contacting events; and
   outputting an error message if a maximal number is exceeded.

17. The method of claim 1, further comprising:
   examining and monitoring a continuous series of contacting events in the course of machining of the work piece by the tool; and
   if the series is interrupted, concluding that the tool is no longer in mesh with the work piece; and
   outputting an error message.

18. The method of claim 1, further comprising:
   examining and monitoring a continuous series of contacting events in the course of machining of the work piece by the tool, wherein the number of contacting events must exactly correspond to the number of the cutting edge meshings of the tool which are to result per revolution of the tool based on the number of the cutting edges of the tool; and
   if a lower number of contacting events occurs, concluding that individual cutting edges of the tool are not in mesh.

19. The method of claim 1, wherein contact between the work piece and the tool is realized by at least one of an electrically conducting bearing, a metallic plate that has a gap of a constant width to the spindle shaft, or via a sliding contact.

20. The method of claim 1, wherein the residual material machining is aligned with the tool at the surfaces machined by the previously used tool by translational displacement and/or torsion in space.

* * * * *